United States Patent Office 2,782,952
Patented Feb. 26, 1957

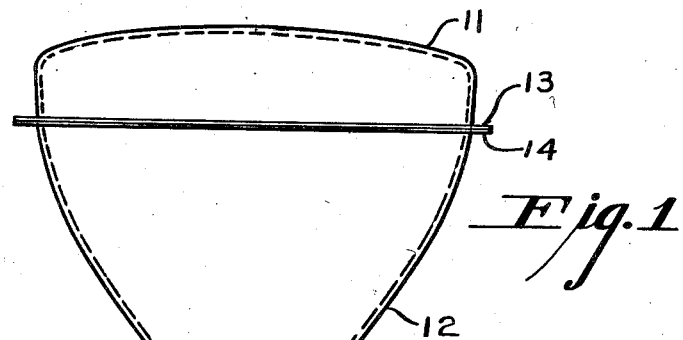
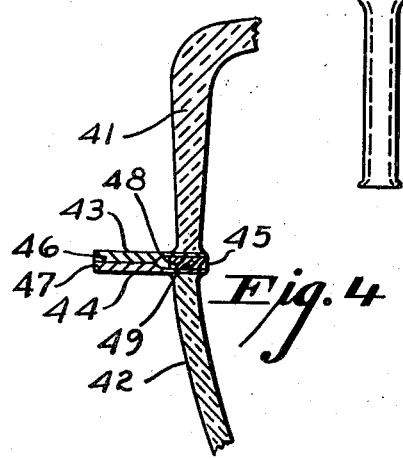
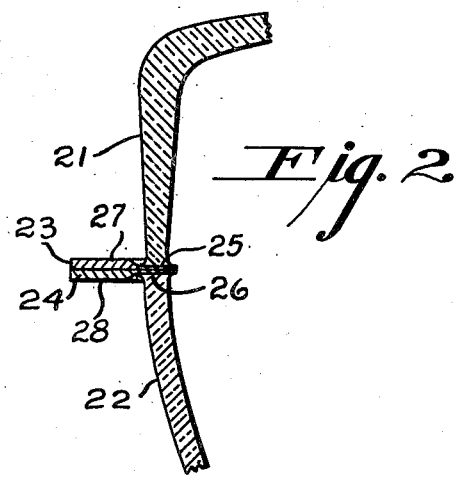
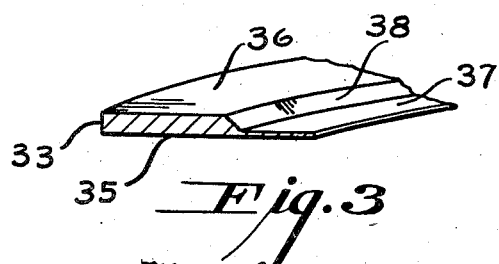
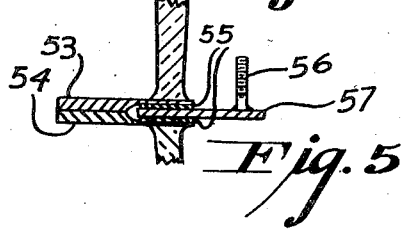

2,782,952

CATHODE-RAY TUBE ENVELOPE

Robert H. Dalton and Raymond O. Voss, Corning, N. Y., assignors to Corning Glass Works, Corning, N. Y., a corporation of New York Application April 13, 1954, Serial No. 422,826

4 Claims. (Cl. 220—2.3)

The present invention relates to glass-to-metal seals wherein complementary endless surfaces of two glass parts, such for example as the funnel and panel members of a television picture tube envelope assembly, may be separately joined to metal strip and the sides of the strips opposite to which the members are sealed brought together and then sealed to one another to provide a hermetic seal between the panel and funnel members.

Glasses are customarily sealed to metals and alloys by melting the glass and contacting it with the metal. Such seals may be classified as those in which the expansion coefficients of the glass and the metal are substantially matched and those in which the expansion coefficients are dissimilar.

Most glass-to-metal seals are of the first type, in which the expansion coefficient of the glass between its setting point and room temperature is so close to that of the metal through the same temperature range that differences in contraction of the metal and the glass on cooling do not cause breaking stresses in the glass. When the expansion coefficients are so matched, the thickness of the metal member at the seal is relatively unimportant. However, when the expansion coefficients of the glass and the metal are dissimilar, the thickness of the metal member at the seal is very important. Successful sealing with mismatched expansion coefficients requires that the metal member be very thin at the area of the seal.

It is the latter type of seal employing aluminum sealing strips with which the present invention is concerned. From our copending application Serial No. 219,430, filed April 13, 1951, now Patent No. 2,707,850, of which this application is a continuation-in-part it is known that an aluminum strip can be successfully sealed or welded, without melting of the aluminum, to a glass having a working point above the melting point of aluminum by the use of a sealing glass having a working point below the melting point of aluminum and a thermal expansion coefficient not more than $10 \times 10^{-7}$ per ° C. different than the glass, provided the thickness of the aluminum member at the area of sealing or welding is not over 7 mils.

It has occurred to us that two glass members, such for example as the panel and funnel members of a television picture tube, as ordinarily adapted to be directly welded to one another to form a completed picture tube envelope, can conveniently have their sealing surfaces separately joined by a suitable sealing glass to aluminum sealing strips, as taught by the above copending application, after which such parts may be brought into register and the aluminum strips welded to one another along an area laterally disposed from the glass-aluminum seals to complete a seal between such parts.

It has been discovered however that it is extremely difficult to reliably weld two 7 mil thickness aluminum strips to one another. The problem was finally solved according to this invention by making each strip, in transverse cross-section, of approximately 7 mils thickness in the area to be occupied by the glass seal and by imparting to the area of the strips to be sealed to one another such added thickness as is found to be suitable for satisfactorily welding them to one another. Pressure tight seam weld seals can be made between aluminum strips of about 10 mils or greater thickness in a manner fully described on pages 703 and 704 of the "Welding Handbook," third edition, published by American Welding Society.

It would appear at first blush that a seal of the foregoing character would afford a rather weak mechanical coupling between a picture tube panel member and its companion funnel member. Since, however, the picture tubes are evacuated to a high degree the panel and funnel members are pressed into rigid relationship by external air pressure, and therefore mechanical rigidity of the seal itself need not be relied upon for imparting mechanical strength to the envelope.

The accompanying drawing illustrates in Fig. 1 a side elevation of a picture tube envelope assembly embodying the invention.

Fig. 2 is an enlarged fragmentary view in section of a preferred form of seal between the panel and funnel members of such an assembly.

Fig. 3 is a perspective view of a greatly enlarged fragment of a sealing strip employed in accordance with the invention.

Fig. 4 is a view similar to Fig. 2 illustrating an alternative embodiment of the invention.

Fig. 5 is a view similar to Fig. 4 illustrating a further alternative embodiment of the invention.

Referring to the drawing in detail, numeral 11 designates the envelope panel member, 12 the funnel member thereof, and 13 and 14 their respective sealing strips.

The sealing strips for the panel and funnel are identical and accordingly a description of a typical sealing strip 33 shown in transverse cross section in Fig. 3 will suffice. Such strip is seen to have a relatively thick outer portion and an adjoining relatively thin inner portion. One face 35 of the strip is a planar throughout the strip width, whereas the oppositely disposed face of the strip has concentrically disposed planar surfaces 36 and 37 at two levels joined to one another as by a beveled annular surface 38.

In the form of the invention illustrated in Fig. 2 the panel portion 21 of a tube envelope is sealed to surface 25 of the thin cross-sectional portion of an aluminum strip or ring 23 having an integrally adjoining thick cross-sectional portion 27. A similar but oppositely disposed strip or ring 24 having a thick portion 28 is in a similar fashion sealed to the funnel portion 22 of the tube envelope. The thick strip portions 27 and 28 are then welded to one another to establish a hermetic seal between the funnel and panel members.

In the form of the invention illustrated in Fig. 4 the strips 46 and 47 have the inner regions of their surfaces 43 and 44, respectively, sealed to the panel 41 and funnel 42 after which the panel and funnel are arranged with their strips in sealing relation and with a gasket 45 interposed between opposing surfaces 48 and 49 thereof. The abutting surfaces opposite surfaces 43 and 44 are then welded to one another to effect the hermetic seal. Obviously, the gasket 45 reduces point loading along the seal line when the finished tube is evacuated and is conveniently made of a thickness corresponding to the spacing between surfaces 48 and 49 to reduce distortion of the strips along the line of juncture of their thick and thin portions.

The form of the invention illustrated in Fig. 5 is similar to that of Fig. 4, except that the gasket 45 of Fig. 4 has been replaced by two gaskets 55 having sandwiched therebetween a support 57 projecting into the envelope for accommodating a color viewing-screen assembly.

Support 57 is provided at spaced intervals with studs such as 56 for attachment of such an assembly thereto.

As will be understood, this invention is equally applicable to either circular or non-circular including the so-called rectangular-type picture tubes, the glass-sealing portions of the metal sealing elements being merely conformed to the outline of the glass surfaces to which they are to be butt-sealed.

It should be further understood that, although the shape of the panels illustrated closely follows that embodied in commercial "all-glass" black-and-white picture tubes, the invention is not limited in this respect, since sealing strips embodying the invention can with equal facility be sealed to shallow-walled, concave-convex, or substantially flat panels such as are ordinarily employed in metal-funnel picture tubes.

What is claimed is:

1. An article of manufacture comprising two glass members having complementary endless planar sealing surfaces facing one another, two metal strips piled one upon the other and arranged in part between such surfaces and having planar sealing surfaces complementary to the sealing surfaces of said members, each strip having a seal portion sealed to the adjoining member sealing surface, said strips having portions that are thick relative to any of the portions thereof that are sealed to the glass members, said relatively thick portions projecting outwardly from the lateral border outlines of such seal portions in planes parallel thereto and being hermetically joined to one another in a plane intermediate to those occupied by the respective glass-metal seals.

2. A television picture tube envelope comprising two glass parts having planar endless sealing surfaces joined to one another through the medium of a seal arranged between such parts, said seal including two complementary flat strips of aluminum piled one upon the other, each such strip in any transverse cross-section of the seal having inner and outer regions in the same plane, one being thick relative to the other, each of said sealing surfaces being sealed to a surface of the thinner region of a different one of said metal strips, and adjacent surfaces of the thicker regions of said strips being sealed to one another.

3. A picture tube envelope such as defined by claim 2 wherein the thickness of each strip throughout the region which is sealed to the glass part does not exceed 7 mils and in the region which is sealed to the other strip is substantially over 7 mils in thickness.

4. A picture tube such as defined by claim 3 wherein the surfaces of the strips to which the parts are sealed are planar throughout the strip width so that a space corresponding to the difference in thickness of the inner and outer region of the strips remains between the thinner portions of said strips, and a cushion occupying such space.

References Cited in the file of this patent
UNITED STATES PATENTS

| | | |
|---|---|---|
| 2,423,066 | Gibson | June 24, 1947 |
| 2,531,623 | Hale et al. | Nov. 28, 1950 |
| 2,635,205 | Olson | Apr. 14, 1953 |